INVENTORS
KEITH E. CLOSE
FRANK HOPKINS
BY
*HP Ferry*
ATTORNEY

May 24, 1966   K. E. CLOSE ETAL   3,252,675
MONITORING APPARATUS FOR AIRCRAFT CONTROL SYSTEM
Filed Oct. 18, 1963   2 Sheets-Sheet 2

INVENTORS
KEITH E. CLOSE
FRANK HOPKINS
BY
*HP Terry*
ATTORNEY

United States Patent Office 3,252,675
Patented May 24, 1966

3,252,675
MONITORING APPARATUS FOR AIRCRAFT CONTROL SYSTEM
Keith E. Close and Frank Hopkins, Phoenix, Ariz., assignors to Sperry Rand Corporation, Great Neck, N.Y., a corporation of Delaware
Filed Oct. 18, 1963, Ser. No. 317,167
7 Claims. (Cl. 244—77)

The present invention relates to an improvement in monitoring apparatus for control systems for movable craft. The monitoring apparatus of the present invention detects signals in the control system which are indicative of dynamic malfunction or of inordinately large command signals and monitors the system to prevent structural failure of the craft and discomfort to the passengers and crew on board the craft. The improved monitoring apparatus is particularly adaptable for monitoring the functions of an aircraft automatic flight control system.

Previously monitoring apparatus of this general character suffered numerous disadvantages. For example, monitoring systems for aircraft flight control systems of the character disclosed in U.S. Patent No. 2,487,793 issued November 15, 1949, to O. E. Esval et al., entitled "Object Controlling Electric Motor System," require the inclusion therein of additional elements for sensing the actual motion of the craft about each monitored axis, such as a pair of accelerometers as exemplified in said patent. The present invention does not require any auxiliary motion sensing apparatus of this type. Further, in aircraft flight control systems of the general type disclosed in said patent it was also necessary to bypass or disable the monitoring apparatus during maneuvers of the craft commanded by the human pilot or when switching from one mode of operation to another, thereby causing the flight control system to be unmonitored during a critical phase. The present invention, in contrast, provides for continuously monitoring the automatic flight control system.

In addition, monitoring systems of the type which include command compensation, for example, as shown in U.S. Patent No. 2,823,877, entitled "Control Systems for Dirigible Craft," issued February 18, 1958, to J. J. Hess, Jr., have no provision for detecting a malfunction of the command signal generating apparatus. In the system as disclosed in said Patent No. 2,823,877, a malfunction of the craft controlling or maneuvering signal means will affect the malfunction detector in the same manner as a valid command signal. Hence, the aircraft could be subjected to an unwanted maneuver while the malfunction detector of said U.S. Patent 2,823,877 would be prevented from disabling the automatic flight control system because of the command compensation circuit. In contrast, the present invention removes the compensation for command signals after sufficient time has passed for the system to become stabilized. In the system of the present invention, therefore, a malfunction signal from the command signal generating means will not be compensated and will result in rendering ineffective the automatic flight control system, for example, by disengagement thereof, thereby providing continuous accurate monitoring of the automatic flight control system including its command signal generating means.

The present invention further includes a comparison of the signals from the basic stabilization sensors whereby the pitch attitude signal from a vertical gyro is compared with the rate of pitch signal from a pitch rate gyro by means of suitable correlating networks. During a turn of the aircraft, the pitch rate gyro signal includes a component of the yaw rate due to its tilted condition in the craft. A lift correction signal used usually to provide for accurate computation of the total elevator command voltage provides a dual function in that a portion of the lift correction signal serves to cancel the portion of the pitch rate gyro output which is produced by yaw rate during banked turns in order that the pitch rate gyro signal may be compared accurately with the vertical gyro pitch signal when the aircraft is in banked turn. This portion of the lift correction signal also provides for disengagement of the automatic flight control system in the event of a dynamic failure of the lift correction transducer.

The monitoring apparatus of the present invention is arranged such that any failure within the monitoring apparatus itself will also cause automatic pilot disengagement. The combination of improvements of the present invention permits an aircraft utilizing the monitored autopilot of the present invention to fly into areas where conventional apparatus might not be permitted.

The present invention is applicable to automatic flight control systems of various types including the type disclosed in U.S. Patent 3,079,109 issued February 26, 1963, to G. F. Jude et al., entitled "Aircraft Automatic Pilot."

It is a primary object of the present invention to provide monitoring apparatus for control systems that is continuously effective and provides accurate monitoring for all of the signal generating devices of the control systems.

It is an additional object of the present invention to provide monitoring apparatus for control systems which is continuously operative to provide monitoring when going from one mode of operation to another of the control system.

It is a further object of the present invention to provide monitoring apparatus for automatic flight control systems in which a signal representative of the lift compensation required during the turns provides a dual function, one in the automatic flight control system and the other in the monitoring system.

Other objects of the present invention will become apparent from the following description read on the accompanying drawings, wherein.

Figure 1:
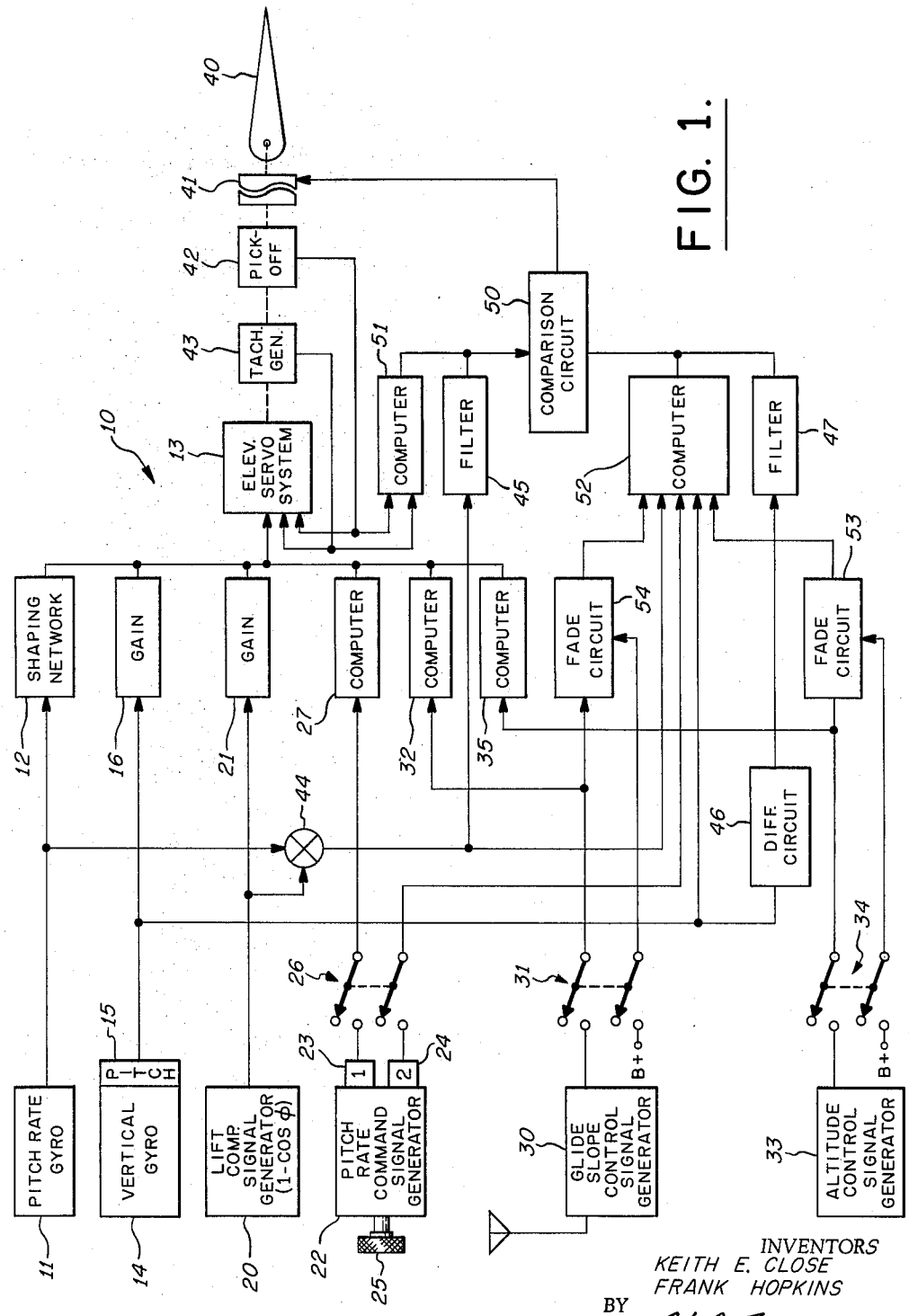
FIG. 1 is a schematic wiring diagram of monitoring apparatus incorporating the present invention utilized with an automatic flight control system for aircraft.

The automatic flight control system or autopilot illustrated in FIG. 1 normally functions to maintain the aircraft at a predetermined reference attitude with respect to an axis. For purposes of example, the system is disclosed with respect to the pitch channel for controlling the aircraft about the pitch axis since this axis is of primary concern for monitoring purposes. It will be appreciated, however, that the present invention is equally applicable for monitoring the flight control system with respect to the roll and yaw axes of the craft.

Referring to FIG. 1, the automatic flight control or autopilot system 10 is conventional and may be of the type shown in any of the aforementioned patents or other known types. It includes a pitch rate gyro 11 which provides a signal representative of the rate of pitch of the aircraft which is connected through a shaping network 12 to the elevator servo system 13. A vertical gyro 14 has its pitch pick-off 15 adapted to provide a signal representative of the pitch attitude of the aircraft which is connected through a gain network 16 to the elevator servo system 13. To compensate for the decrease in lift during turns which results in decreased altitude, a lift compensation signal generator 20 provides a signal representative of one minus the cosine of the roll angle through a gain network 21 to the elevator servo system 13. The lift compensation signal generator 20 may be of the type disclosed in said U.S. Patent 3,079,109.

A pitch rate command signal generator 22 provides dual signals representative of the commanded pitch rate from a pair of ganged potentiometers 23 and 24, upon adjustment of the pitch rate knob 25. With pitch rate command switch 26 in its downward position, as viewed in FIG. 1, the potentiometer 23 is connected to a computer network 27 which in turn is connected to the elevator servo system 13 and provides pitch rate command signals thereto. A glide slope control signal generator 30 is responsive to the radio signal from a ground based glide slope transmitter in the glide slope mode of operation to provide a signal representative of the deviation of the aircraft from the predetermined glide slope along which the aircraft is being controlled to fly. With glide slope switch 31 in its downward position, the glide slope signal is connected through a computer network 32 to the elevator servo system 13. An altitude control signal generator 33 which may form a portion of an air data system provides a signal representative of the deviation of the aircraft from a predetermined desired altitude. With altitude switch 34 in its downward position, the altitude control signal is connected through a computer network 35 to the elevator servo system 13. The shaping, gain, and computer networks 12, 16, 21, 27, 32 and 35 are conventional and may be of the type disclosed in said U.S. Patent 3,079,109. The combination of signals entering the elevator servo system 13 cause it to operate in a manner to drive the elevator 40 in a direction to maintain the aircraft at a predetermined attitude with respect to the pitch axis in order to maintain a desired flight path. The elevator servo system 13 may be disengaged from the elevator control surface 40 by means of an electromagnetic clutch 41. A displacement pick-off 42 is responsive to the position of the control surface 40 and provides a displacement feedback signal to the elevator servo system 13 while a tachometer generator 43 provides a feedback signal representative of the rate of movement of the control surface 40 to the elevator servo system 13, when clutch 41 is engaged.

In order to continuously and accurately monitor the operation of the autopilot 10, malfunctions are detected by making two basic comparisons of signals. First, the operation of the basic sensing devices is compared by checking a differentiated pitch signal from the vertical gyro 14 against the rate of pitch signal from the pitch rate gyro 11. The orientation of the pitch rate gyro 11 causes it to detect a portion of the yaw rate during banked turns. Since the vertical gyro 14 is not susceptible to this type of cross-coupling; the aforementioned comparison will be erroneous during banked turns unless the portion of yaw rate sensed by the pitch rate gyro 11 is compensated. This compensation is derived from the lift compensation signal $(1-\cos \phi)$. The lift correction signal therefore provides a dual function, one in the autopilot system and the other in the monitoring channel. The $(1-\cos \phi)$ term is the "versine signal" commonly used to provide lift compensation. It is particularly adaptable in this application because it is a close approximation of the $\sin \phi \tan \phi$ term which exactly describes the apparent pitch rate sensed by the pitch rate gyro in a coordinated turn with bank angle $\phi$.

An alternate method of providing the compensating signal would be to use the output from a normal accelerometer i.e.

$$\frac{1-\cos \phi}{\cos \phi}$$

in a coordinated turn. This also provides a good approximation of $\sin \phi \tan \phi$ for bank angles up to 40 or 50 degrees.

To provide the first comparison, the pitch rate gyro 11 and the lift compensation signal generator 20 are connected to the input terminals of an algebraic summation device 44 which has its output connected to a filter circuit 45. The pitch pick-off 15 of the vertical gyro 14 is connected through a differentiating circuit 46 to a filter circuit 47. The filter circuits, 45 and 47, are bandpass filters which permit the passage of signals in the frequency range of normal aircraft control while excluding signals above and below the operating frequency range. The filter circuits 45 and 47 are connected to a comparison circuit 50 in order to provide a comparison of the differentiated pitch attitude signal with the pitch rate signal that is compensated for yaw rate during roll by the $(1-\cos \phi)$ lift compensation signal. The comparison circuit 50 which may include signal amplifying means if necessary is connected to disengage the clutch 41 when the mismatch of the compared signals exceeds a predetermined magnitude.

In operation, if either of the signals from the pitch rate gyro 11 or the vertical gyro 14 are missing or contain components due to malfunction or undesirable aircraft motion, the comparison in the circuit 50 provides a mismatch signal that disengages the clutch 41. With a certain aircraft, the design intent of the pitch monitor was to cause disengagement of the autopilot if the mismatch signal would produce a normal acceleration of 1 G in 3 seconds. This establishes the sensitivity levels for this particular application for the filters 45 and 47 by requiring a .165 volt step function at the input of the filter 47 or a .165 volt second ramp at the input of the filter 45 to produce disengagement.

The second comparison matches the elevator response with the combined signals which are commanding the elevator response. To accomplish this, the elevator response signals from the elevator position pick-off 42 and the tachometer generator 43 are connected to a monitor computer 51 which is in turn connected to the comparison circuit 50. In addition, the pitch rate gyro signal compensated for yaw rate during roll is connected through the algebraic summation device 44 to a monitor computer 52. The vertical gyro 14 also provides a pitch attitude displacement signal to the computer 52. With the ganged switch 26 in its downward position, the pitch rate command potentiometer 24 is connected to the computer 52. Further, in the glide slope mode of operation with the ganged switch 31 in its downward position, the glide slope signal generator 30 is connected through a fade circuit 54 to the computer 52 in a manner to be more fully explained. In the altitude control mode of operation with the ganged switch 34 in its downward position, the altitude control signal generator 33 is connected through a fade circuit 53 to the computer 52. The computers 51 and 52 are connected to the comparison circuit 50 in order that any mismatch of the signals therefrom may result in disengagement of the clutch 41 as well as actuating other suitable circuitry in a manner generally disclosed in said U.S. Patent No. 2,823,877. As explained in said U.S. Patent No. 2,823,877, the computer 52 provides a simulation of the command inputs through the automatic pilot 10 to provide a valid comparison with the feedback signals that are representative of the elevator servo system response. The computers 51 and 52 may be generally of the type shown in said U.S. Patent No. 2,823,877 in which the computer 52 includes command compensation circuitry. As taught in said Patent No. 2,823,877, the arrangement and values of the resistance, capacitance and inductance electrical components forming the command compensation circuitry are selected so that the computer 52 provides an output in accordance with the component of the output of the servo system 13 due to the inclusion in the autopilot system 10 of the signal of the craft controlling means.

The comparison circuit 50 may for example, include a cutoff relay that causes the clutch 41 to disengage and may also provide other switching action to the autopilot system 10 when a mismatch signal of a predetermined magnitude is experienced therein. The switches 31 and 34 have ganged contact arms in order that in their downward positions, a B+ power supply provides a voltage $E_2$ of, for example, 28 volts D.C., and is connected to the fade circuits 53 and 54 for reasons to be explained. In order to guard against application of pitch commands from a malfunctioning pitch rate command potentiometer 23, a duplicate potentiometer 24 is used to provide the comparison signal to the monitor.

In operation, the elevator servo rate and displacement feedback signals are fed into the monitoring circuitry to the computer 51 in order that its output signal may be compared with all of the basic control signals which feed into the autopilot pitch axis that are also connected to the computer 52. The computer 52 contains an electrical duplication of the computers, gain adjustments, and shaping networks used in the autopilot 10 which results in the elevator servo rate and displacement feedback signals. If the two values of the voltages computed by the computers 51 and 52 when compared in the comparison circuit 50 do not agree, a mismatch signal is provided which, if it exceeds a predetermined value, causes disengagement of the clutch 41. The computers 51 and 52 include bandpass filtering which causes the signal comparison to be effective only in the control frequency range of the combined aircraft and flight control system.

In accordance with the present invention, the comparison signals provided to the monitor computer 52 for glide slope and altitude hold modes of operation are processed in a unique manner. In normal operation, glide slope signals after the initial capture of the glide slope beam by the aircraft will not be large enough or change rapidly enough to require compensation. However, during the capture of the glide slope beam, the transient glide slope signal may be large enough to cause disengagement of the clutch 41 unless command compensation is provided as explained above. Since the monitoring circuitry is to provide accurate and continuous monitoring, command compensation for this transient must be provided, for example, in the manner shown in said U.S. Patent No. 2,823,877. If this command compensation for the glide slope transient signal remains effective in the monitoring circuit, which it must to prevent disengagement during beam capture, the command compensation will continue to provide compensation although the glide slope control signal generator provides hard-over malfunction signals because the comparison signals are matched although large.

In order to provide maximum protection from malfunctions, the present invention effectively removes the command compensation after sufficient time has elapsed for the transient to reduce to a small value by means of the fade circuit 54. The fade circuit 54 allows the large transient signal to pass at the inception of the glide slope mode of operation during beam capture and then gently removes the comparison signal by reducing the gain of the comparison signal path to, for example, one-tenth the initial value in 15 seconds while the autopilot signal path gain remains substantially the same.

Similarly, in normal operation during cruising flight in the altitude hold mode of operation, the normal altitude error signals from the altitude control signal generator 33 will be small and of a long period nature. Signals which are not of this nature are indicative of a malfunction or a condition where the use of the altitude hold mode is not desirable, such as turbulent air conditions. On this basis, it is considered desirable to have the altitude error signal uncompensated in the steady state condition. At the time of altitude hold engage, monitor nuisance tripping or disengagement may occur if the altitude hold mode is engaged while the aircraft is in a high rate of climb or descent. This is avoided in accordance with the present invention by utilizing the fade circuit 53 in the monitoring circuitry as explained above with respect to the glide slope engage mode.

This method provides for complete and accurate comparison of the elevator command signals during the transient period when the path control signals, i.e., glide slope or altitude, are large. After either of these modes of control is established, a properly operating autopilot supplied with reliable control inputs (a non-turbulent air mass and a clean glide slope signal) will operate to maintain the input error signals substantially zero. An inordinately large control signal is therefore indicative of a malfunction in the source (glide slope beam transmitter), the detecting equipment (glide slope receiver) or the autopilot equipment upstream from the pick-off point (radio coupler). Under such conditions it is desirable that the autopilot be disengaged. The fade circuits 53 and 54 by removing the path control comparison signals after the initial transient period make it possible for the monitoring apparatus of the present invention to detect these upstream failures.

Figure 2:
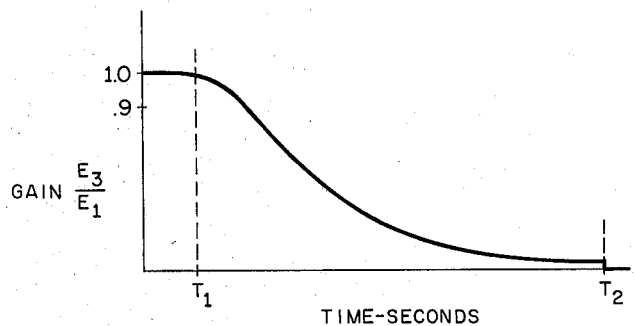
FIG. 2 is a graph disclosing the characteristics of the fade circuit of FIG. 1.

The desired form of the fade circuit characteristic is shown in FIG. 2. A suitable fade circuit having this characteristic and requiring a minimum of components while providing high reliability is shown in FIG. 3.

Figure 3:
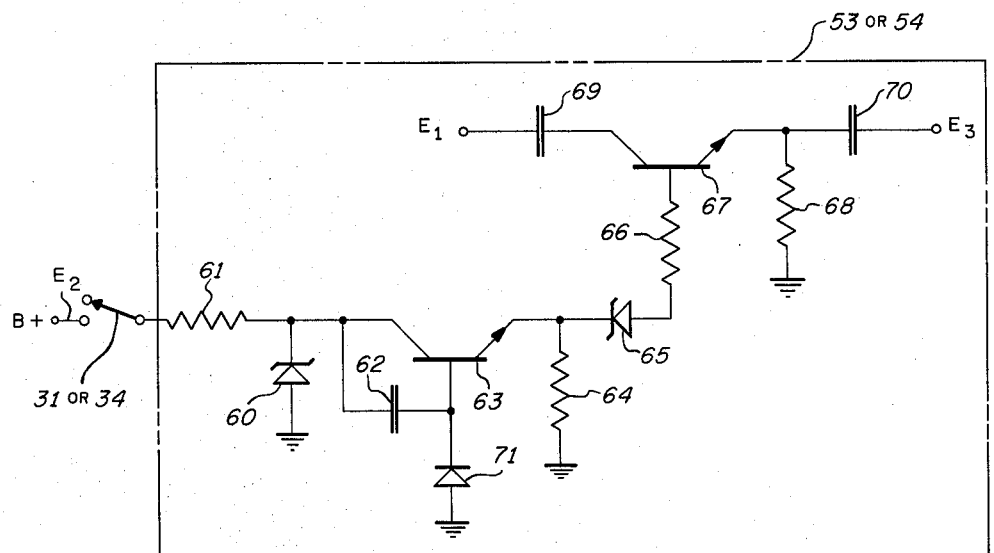
FIG. 3 is a schematic wiring diagram of a fade circuit of the type shown generally in FIG. 1.

In the operation of the fade circuit of FIG. 3, with either the switch 31 or 34 in its downward position, the voltage $E_2$ from the B+ power supply is regulated by a zener diode 60 so that the effect on the remainder of the fade circuit is the same for each operation, regardless of variations in the $E_2$ supply. When the voltage $E_2$ is applied to the fade circuit, current flows through a resistor 61, a capacitor 62, the base of a transistor 63 and a resistor 64. The flow of current through the base of the transistor 63 causes it to have a low collector to emitter impedance. The regulated voltage across the zener diode 60 then appears across the resistor 64. The flow of current through the capacitor 62 causes it to become charged, thereby causing the base current flow through the transistor 63 to decrease exponentially. The exponential reduction of the transistor base current in turn results in an exponential increase in its collector to emitter impedance. Accordingly, the proportion of the regulated voltage across the zener diode 60 which appears across the resistor 64 also decreases exponentially.

The exponentially decaying voltage across the resistor 64 is impressed across the series circuit formed by a zener diode 65, a resistor 66, the base to emitter of a transistor 67, and a resistor 68. These components are so chosen that the initial value of the exponentially decaying voltage across the resistor 64 will cause saturating current to flow from the base to the emitter of the transistor 67 for the normal operating magnitude of A.C. input control voltage $E_1$ from the glide slope or altitude control signal generator 30 or 33. The saturating current flowing from the base to emitter of the transistor 67 causes the impedance from its collector to emitter to be very low. Under this condition, the A.C. input control voltage $E_1$ is applied across the resistor 68 through a capacitor 69 and the very low collector to emitter impedance of the transistor 67, and thence through a capacitor 70 to appear as the fade circuit output $E_3$.

As the voltage across the resistor 64 decays exponentially, the base current of the transistor 67 accordingly decreases exponentially. At some time, $T_1$, following the application of $E_2$, the base current of the transistor 67 will have decreased to such a point that the transistor 67 is no longer saturated. At that point, as the base current of the transistor 67 continues to decrease, its collector to emitter resistance will start to increase exponentially. The output voltage $E_3$ will likewise decrease exponentially, after having remained constant and equal to the input voltage $E_1$ until time $T_1$ as shown in the graph of FIG. 2.

As the voltage across the resistor 64 continues to decrease exponentially, it eventually reaches the breakdown voltage characteristic of the zener diode 65 at time, $T_2$. At time $T_2$, current ceases to flow from the base to the emitter of the transistor 67 and its collector to emitter impedance becomes very high. The A.C. output voltage $E_3$ is then dropped essentially to zero as shown in FIG. 2.

The desired gain versus time characteristic illustrated in FIG. 2, has thereby been generated by the fade circuit. The characteristic starts at the time that the B+ power supply voltage $E_2$ is applied to the fade circuit. When $E_2$ is removed, as will occur when the switch 31 or 34 that supplied it is returned to its upper position, the capacitor 62 discharges through the diode 71, thus placing the fade circuit in a state of readiness for the next operation.

The capacitors 69 and 70 block the D.C. voltage at the transistor 67 thereby preventing it from appearing in the A.C. circuit at $E_1$ or $E_3$. The resistor 64 may be made temperature sensitive to provide compensation for temperature effects on the capacitor 62 or the transistor 63 in a well known manner not shown.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In apparatus for monitoring an aircraft flight control system which normally functions to control an aircraft with respect to an axis,
    (a) servo system means normally effective for controlling said aircraft with respect to said axis including means for providing a first signal representative of the servo system means operation,
    (b) command signal generating means for providing a command signal with respect to said axis for operating said servo system means,
    (c) malfunction detecting means responsive to said signals for monitoring said flight control system including command signal compensation means responsive to said command signal for modifying said command signal to prevent inadvertent operation of said malfunction detecting means,
    (d) signal attenuating means coupled between said command signal generating means and said command signal compensation means for attenuating said command signal to a predetermined low magnitude within a predetermined time interval for permitting detection of a malfunction of said command signal generating means,
    (e) and said malfunction detecting means further including comparison means responsive to said compensated and attenuated command signal and said first signal for providing a comparison therebetween whereby said flight control system is continuously monitored and when their difference exceeds a predetermined magnitude said servo system means is rendered ineffective for controlling said aircraft.

2. In apparatus for monitoring a flight control system for aircraft which normally functions to maintain said craft in a predetermined attitude with respect to an axis,
    (a) servo means normally effective for positioning said craft with respect to said axis,
    (b) craft controlling means for providing an operating signal to said servo means,
    (c) motion sensing means responsive to craft movement for providing a control signal to said craft controlling means in accordance with the actual motion of said craft with respect to said axis,
    (d) command signal generating means for providing a command signal to said craft controlling means for commanding craft motion with respect to said axis,
    (e) feedback signal generating means for providing a feedback signal to said craft controlling means representative of the output of said servo means,
    (f) malfunction detecting means responsive to said control signal, command signal, and feedback signal for providing an output for monitoring said flight control system when the combination of said signals exceeds a predetermined magnitude, said malfunction detecting means further including means for modifying said command signals to permit said malfunction detecting means to operate continuously in spite of command signals which would otherwise provide an output indicative of malfunction, and
    (g) fade circuit means coupled between said command signal generating means and said malfunction detecting means for slowly attenuating said command signal to a predetermined value within a predetermined time interval in order that malfunction of said command signal generating means is detectable.

3. In a monitoring system for aircraft,
    (a) vertical gyro means for providing a signal representative of the pitch attitude of an aircraft,
    (b) pitch rate gyro means for providing a signal representative of the rate of pitch of said aircraft,
    (c) pitch rate command signal generating means for providing a command signal representative of the desired rate of pitch of said aircraft,
    (d) glide slope control signal generating means for providing a signal representative of the deviation of the aircraft from a predetermined glide slope,
    (e) altitude control signal generating means for providing a signal representative of the deviation of the aircraft from a predetermined altitude,
    (f) pitch servo means responsive to predetermined combinations of the aforementioned signals for controlling said aircraft to fly with respect to a predetermined flight path,
    (g) pitch axis monitoring means responsive to said signals for providing a comparison between pitch channel feedback signals and a signal representative of the sum of said predetermined combination of signals for providing a malfunction signal in the event the difference therebetween exceeds a predetermined magnitude for rendering said servo system ineffective, and
    (h) fade circuit means disposed between said glide slope and altitude control signal generating means and said monitoring circuit for reducing said glide slope and altitude signals to a relatively small value after a predetermined time interval consistent with the operation of said servo system whereby continuous monitoring is provided and command compensation is eliminated by means of said fade circuits for detecting malfunction of said control signal generators at all times.

4. In a monitoring system of the character described in claim 3 in which during banked turns said pitch rate gyro senses a component of the yaw rate,
    (a) means for generating a compensating signal as a function of the roll angle of said aircraft, and
    (b) means for compensating said pitch rate signal in accordance with said compensation signal.

5. In a monitoring system of the character described in claim 3 in which during banked turns said pitch rate gyro senses a component of the yaw rate,
    (a) means for generating a lift compensation signal as a function of the roll angle of said aircraft,
    (b) means for compensating said pitch rate signal in accordance with said lift compensation signal, and
    (c) comparison means responsive to said pitch attitude signal and said lift compensated pitch rate signal for providing a malfunction signal when the difference therebetween exceeds a predetermined magnitude whereby the basic aircraft motion sensors are monitored.

6. In a monitoring system of the character described in claim 3 in which during banked turns said pitch rate gyro senses a component of the yaw rate,
 (a) means for generating a compensation signal approximating the sine of the bank angle multiplied by the tangent of the bank angle, and
 (b) means for compensating said pitch rate signal in accordance with said compensation signal.

7. In a monitoring system of the character described in claim 6 in which said compensation signal is representative of one minus the cosine of the bank angle.

References Cited by the Examiner
UNITED STATES PATENTS
2,859,005  11/1958  Owen _____ 244—77

FERGUS S. MIDDLETON, *Primary Examiner.*
R. DAVID BLAKESLEE, *Examiner.*